US006432515B1

(12) United States Patent
Titze et al.

(10) Patent No.: US 6,432,515 B1
(45) Date of Patent: Aug. 13, 2002

(54) FLEXIBLE, MULTILAYERED TRANSFER TAPE

(75) Inventors: Lothar Titze, Uetze; Martina Buchholz, Garbsen; Wolfgang Bauersachs, Wedemark; Karl-Heinz Weissmann, Hannover; Wolfgang Giersemehl, Lehrte, all of (DE)

(73) Assignees: Henkel Kommanditgesellschaft auf Aktien, Duesseldorf; Pritt Produktionsgesellschaft mBH, Hanover, both of (DE)

( * ) Notice: Subject to any disclaimer, the term of this patent is extended or adjusted under 35 U.S.C. 154(b) by 0 days.

(21) Appl. No.: 09/180,152

(22) PCT Filed: Mar. 3, 1997

(86) PCT No.: PCT/EP97/01050

§ 371 (c)(1), (2), (4) Date: Dec. 10, 1998

(87) PCT Pub. No.: WO97/42036

PCT Pub. Date: Nov. 13, 1997

(30) Foreign Application Priority Data

May 3, 1996 (DE) .......................................... 196 17 850

(51) Int. Cl.$^7$ .................................................. B32B 7/12

(52) U.S. Cl. ....................... 428/195; 428/323; 428/332; 428/343

(58) Field of Search ................................ 428/195, 213, 428/214, 354, 914, 220

(56) References Cited

U.S. PATENT DOCUMENTS 4,891,260 A 1/1990 Kunkel et al. .............. 428/220
5,135,798 A 8/1992 Muschter et al. ........... 428/202
5,175,058 A * 12/1992 Traver ........................ 428/447
5,242,725 A * 9/1993 Weismann et al. ............ 428/40

FOREIGN PATENT DOCUMENTS

| | | | |
|---|---|---|---|
| EP | 0 318 804 | 6/1989 | |
| EP | 0 479 221 | 4/1992 | |
| JP | 60 036184 | 2/1985 | |
| WO | 96/28308 | * 2/1996 | ........... B44C/1/165 |

OTHER PUBLICATIONS

K.L. Wolf "Physik und Chemie der Grenzflaechen", Springer Verlag (1957), p. 164.

* cited by examiner

*Primary Examiner*—Bruce H. Hess
*Assistant Examiner*—Michael E. Grendzynski
(74) *Attorney, Agent, or Firm*—Stephen D. Harper; Michael E. Carmen

(57) ABSTRACT

A flexible, multilayered transfer tape is described which contains an auxiliary support, a layer of pressure-sensitive adhesive and a binder containing a white-pigmented transfer layer having greater adhesion to the pressure-sensitive adhesive layer than to the auxiliary support. The transfer layer, which contains a binder in addition to a white pigment, is present between the auxiliary support and the pressure-sensitive adhesive layer. The transfer tape is characterized in that a non-white pigment is present in finely dispersed form in either or both of a polymer-bonded interlayer and the pressure-sensitive adhesive layer. The polymer-bonded interlayer may be situated between the white-pigmented transfer layer and the pressure-sensitive adhesive layer or in the white-pigmented transfer layer itself. Such transfer tapes have significantly improved covering capacity as compared to transfer tapes in which only the white-pigmented transfer layer is tinted.

24 Claims, 1 Drawing Sheet

FLEXIBLE, MULTILAYERED TRANSFER TAPE

FIELD OF THE INVENTION

This invention relates to a multilayer flexible transfer tape comprising an auxiliary support and a layer of pressure-sensitive adhesive, a binder-containing white-pigmented transfer layer showing greater adhesion to the layer of pressure-sensitive adhesive than to the auxiliary support being present between the auxiliary support and the layer of pressure-sensitive adhesive, and to the use of this transfer tape in roll form in a hand-held dispenser.

BACKGROUND OF THE INVENTION

A transfer tape of the above-mentioned type is described in EP-A-0 318 804. According to this document, it is preferably used in roll form in a hand-held dispenser to enable the transfer layer to be applied simply, quickly and uniformly to a substrate for covering errors in texts or drawings and for making subsequent corrections. The transfer layer thus applied may then be written on, for example with writing ink or India ink.

In the case of the described transfer tape, it is of advantage for the white-pigmented transfer layer to be darkened by the incorporation of black pigments, more particularly carbon black. The covering power of the transfer layer is improved in this way. However, the degree of darkening is limited insofar as, if the amount of black pigment used is too large, the white appearance of the tape is impaired and can no longer be described as white. Overall, this,solution is not satisfactory.

BRIEF SUMMARY OF THE INVENTION

Accordingly, the problem addressed by the present invention was to further develop the transfer tape mentioned at the beginning in such a way that the covering power of the transfer layer for the application in question would be improved without any serious effect on its "whiteness".

According to the invention, the solution to this problem is characterized in that a non-white pigment is present in finely dispersed form a) in a polymer-bonded interlayer situated
  a1) between the white-pigmented transfer layer and the layer of pressure-sensitive adhesive or
  a2) in the white-pigmented transfer layer, and/or
b) in the layer of pressure-sensitive adhesive.

Overall, there are thus three versions of the multilayer flexible transfer tape according to the invention. The version in which the non-white pigment is finely dispersed in the layer b) of pressure-sensitive adhesive is preferred. If, in individual cases, the darker impression created when looking down onto the layer of pressure-sensitive adhesive is undesirable, particularly when the non-white pigment is a black pigment, such as carbon black, it is of advantage to use one of the two variants of version a).

BRIEF DESCRIPTION OF THE DRAWINGS

The three versions of the transfer tape according to the invention are described in more detail in the following with reference to the accompanying drawings.

DETAILED DESCRIPTION OF THE INVENTION

Figure 1:
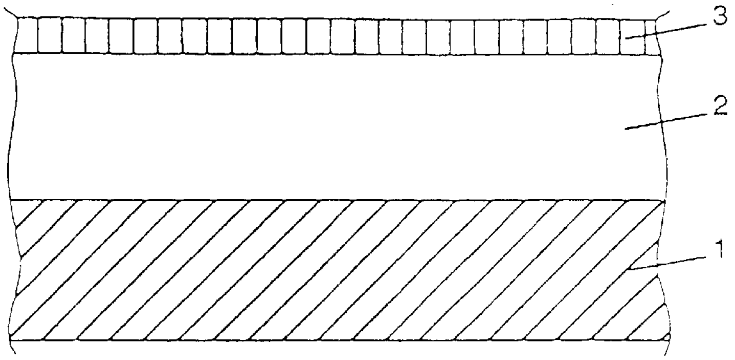
FIG. 1 shows a known transfer tape comprising an auxiliary support (1), a transfer layer (2) and a layer (3) of pressure-sensitive adhesive.
Figure 2:
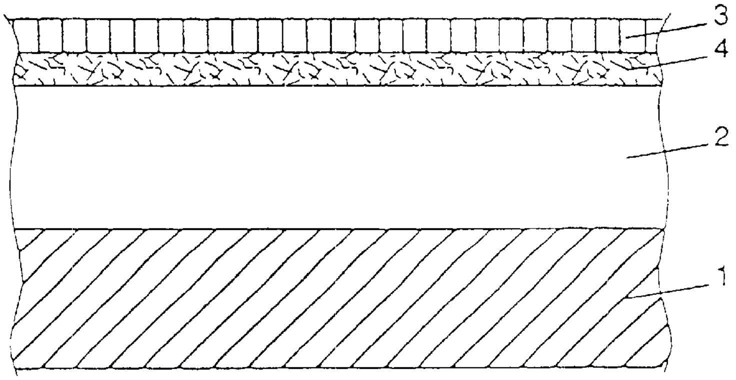
FIG. 2 shows version a1) of the transfer tape according to the invention. A polymer-bonded interlayer (4) containing a finely dispersed non-white pigment is present between the white-pigmented transfer layer (2) and the layer (3) of pressure-sensitive adhesive.
Figure 3:
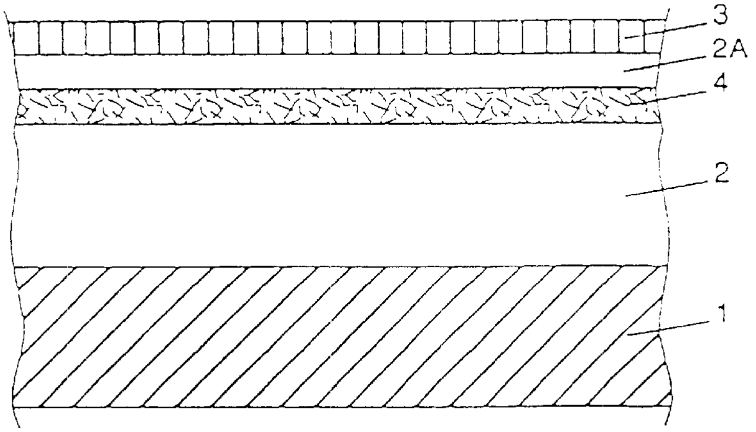
FIG. 3 shows version a2) of the transfer tape according to the invention, in which the non-white-pigmented polymer-bonded interlayer is "sandwiched" by the white-pigmented transfer layer, i.e. the non-white-pigmented interlayer (4) is present between the transfer layer (2) and an additional layer (2A) with the identical composition. The function of the additional layer (2A) is to conceal the dark color impression created by the interlayer (4) when looking down onto a transparent layer of pressure-sensitive adhesive.
Figure 4:
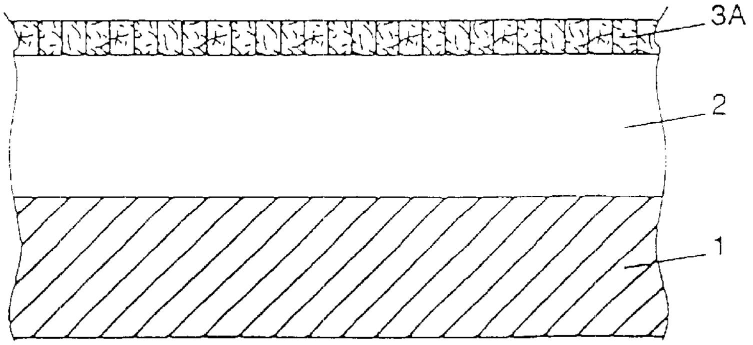
FIG. 4 shows version b) of the transfer tape according to the invention in which a non-white pigment is finely dispersed in the layer (3A) of pressure-sensitive adhesive.

A "non-white pigment" in the context of the invention is preferably a pigment which is substantially similar to the symbols, more particularly letters, to be covered. These are normally blue, black, red or green in color. In general, therefore, the color yellow should not be used. Black pigments, especially carbon black, are particularly preferred in practical applications. Basically, the particle size of the pigments is not critical, although a particle size of about 1.5 to 0.005 $\mu$m and, more particularly, of less than about 1 $\mu$m to colloidal particle size is preferred. Fine-particle metal powders, more particularly fine-particle aluminium, may be used instead of colored pigments. The aluminium particles are preferably lamellar and have a thickness of preferably about 3 to 10 $\mu$m. They may be up to about 15 $\mu$m in length without any problems. Water-based aluminium pastes have proved to be particularly suitable. Aluminium pastes such as these are produced by a special wet grinding process. A particularly preferred paste is marketed by Carl Schlenk AG under the name Aquasilber Aluminiumpaste LPW/1380.

The interlayer and/or the pressure-sensitive adhesive layer preferably contain(s) at least about 0.1% by weight of non-white pigment, more preferably about 0.1 to 5% by weight and most preferably about 0.2 to 3.5% by weight of non-white pigment. If the quantity of non-white pigments used in both layers is below the limit of "less than 0.1% by weight", the desired effect cannot be obtained to the required extent. If, however, this quantity exceeds 5% by weight, no significant improvement is obtained. If this limit is exceeded, for example in connection with the layer of pressure-sensitive adhesive, the result may even be that the adhesiveness of this layer is adversely affected. In order to satisfy functional requirements, a quantity of about 3.5% should not be exceeded.

The transfer layer is "white-pigmented". In other words, it contains conventional white pigments in the quantity necessary to provide the transfer layer with a certain covering power. White pigments of the type in question include in particular titanium dioxide (titanium white) and precipitated chalk, alumina and/or colloidal silicas. According to the invention, however, there is nothing to prevent the transfer layer being additionally toned down with suitable, differently colored pigments. This can be done by incorporating suitable quantities of black pigment, more particularly carbon black, and also by toning down with other pigments, for example yellow and green. Toning down may be necessary where the transfer layer is to be adapted to the color of the substrate on which the lettering, etc. is to be covered. The observations on the particle size of the "non-white pigments" again apply.

Thermoplastic or thermoelastic polymers are used in the form of an aqueous solution or aqueous dispersion to form the binder-containing transfer layer. The following substances are used with advantage to solve the problem addressed by the invention:

a) polyurethanes with a molecular weight of 15,000 to 50,000, for example Permuthane U 4924, a product of Stahl-Chemie, or Desmolac 2100, a product of Bayer AG, b) linear saturated polyesters with a molecular weight of 20,000 to 30,000, for example Vitel PE 307, a product of Goodyear Tire & Rubber, Polyflex 46962, a product of Morton, c) styrene/isoprene/styrene copolymers, for example Clariflex TR 1107, a product of Shell-Chemie, d) acrylates and methacrylates, for example Plexigum 7 H, a product of Roehm, GmbH, e) polyamides modified with diphenyl acid, for example Scope 30, a product of Rhône-Poulenc or Emerez 1533, a product of Emery Chemicals, f) polymer dispersions based on vinyl propionate, for example Propiofan 6D, a product of BASF, and g) water-soluble carboxyfunctional polymethacrylate, for example Rohagit SD15, a product of Roehm GmbH.

This list is by no means complete and does not represent any limitation of choice. On the contrary, it is quite clear to the expert that other binders may also be used, especially since the essence of the invention does not lie in the type of binder used.

In order further to optimize the invention, the type of plasticizer used should also be taken into account in choosing the particular binder for forming the transfer layer. When the transfer layer is applied to the surface to be corrected or covered, the plasticizer should not penetrate through the normally thin layer of pressure-sensitive adhesive and come into contact with the text/symbols to be corrected or the pigments present there, which would result in unwanted coloring of the transfer layer. Conventional plasticizers, such as silicone oil, castor oil and mineral oils, are suitable for this purpose. Plasticizers preferably used in other fields of application, for example phthalic acid esters or oleic alcohol, are not as suitable. In order to counteract the above-mentioned unwanted effect of plasticizers in borderline cases, a so-called "laking agent" may be incorporated in the binder-containing transfer layer to precipitate or render insoluble any migrating pigments in order to prevent them from migrating into and thus coloring the transfer layer applied. Suitable laking agents are tannin and tannin derivatives. The laking agents present in inks and India inks may generally be used. They should be present in the binder-containing transfer layer in quantities of preferably about 0.5 to 5% by weight and, more preferably, about 1.5 to 3.5% by weight, the range from about 2 to to 2.5% by weight being most particularly preferred.

To form the transfer layer, the particular binder selected is preferably present in the form of an aqueous solution or dispersion. In addition, the additives discussed in the following are optionally added. The choice of a suitable solvent or dispersant will be determined by the type of binder used. Suitable solvents/dispersants include in particular low-boiling to medium-boiling organic solvents from the group of alcohols, such as ethanol, isopropanol and butanol, ketones, such as acetone and methyl ethyl ketone, esters, such as methyl and ethyl acetate, aromatic hydrocarbons such as toluene, aliphatic hydrocarbons, such as spirit with a boiling point of 70 to 140° C., either on their own or in admixture, and more particularly water either on its own or in the form of a mixture with low-boiling, water-soluble organic solvents.

The concentration of the binder in the solution or dispersion is not critical to the invention. As an approximate guideline, it should be between about 3 and 15% by weight and preferably between about 6 and 12% by weight. To form the transfer layer, the solution or dispersion is applied to the auxiliary support in a quantity of preferably about 15 to 25 $g/m^2$ (dry weight) and, more preferably, about 18 to 22 $g/m^2$.

An advantageous component of the binder-containing transfer layer is a "stripping aid". When the transfer layer is applied to a substrate under conditions of tensile stress, the stripping aid ensures clean stripping. Suitable stripping aids are cellulose derivatives, among which the cellulose ethers soluble in organic solvents and/or water, such as methyl, ethyl, hydroxyethyl, ethylhydroxyethyl and carboxymethyl celluloses, cellulose esters, such as cellulose acetobutyrate and propionate, are particularly preferred. Many other soluble cellulose derivatives which produce the required effects are also suitable. The basic cellulose skeleton in the soluble cellulose derivative is clearly important whereas the groups introduced by the cellulose modification merely lead to an increase in solubility in the selected solvent.

For optimal formation of the transfer layer, the quantity ratio of stripping aid to binder is about 1:2 to 1:20 and preferably in the range from about 1:4 to 1:10.

The layer of pressure-sensitive adhesive may consist of commercial pressure-sensitive adhesives. These are elastic and permanently tacky self-adhesive compositions with strong adhesion forces which adhere instantly to various surfaces at room temperature, even under light pressure. They are preferably applied in the form of an aqueous dispersion to the transfer layer and, optionally, interlayer already present on the auxiliary support because the layers already formed are not redissolved in this way. Pressure-sensitive adhesives of this type are, in particular, acrylate-based pressure-sensitive adhesives. These starting materials may be viscous solutions and dispersions which are based on rubber, polyacrylates, polyvinyl ethers or polyvinyl isobutylene. Commercial materials based on polyacrylates are preferred. Suitable commercial products are Ucecryl 913 and Ucecryl PC 80 (marketed by ucb Dogenbos, Belgium) and polymer dispersion VP 959/6 (marketed by Freihoff). The pressure-sensitive adhesive to be applied, which is initially present in an aqueous medium, preferably contains wetting agents or surfactants (marketed under the name Byk W). In version b) of the invention, a non-white pigment is finely dispersed in the solution or dispersion of the pressure-sensitive adhesive to be applied. To form the layer of pressure-sensitive adhesive, the dispersion/solution of the pressure-sensitive adhesive, optionally with additives, is applied to the transfer layer or additional layer in a quantity of preferably about 1 to 5 $g/m^2$ (dry weight) and, more preferably, about 2 to 4 $g/m^2$.

According to the invention, the layer of pressure-sensitive adhesive is preferably about 1 to 5 $\mu$m thick and, more preferably, about 2 to 4 $\mu$m thick. The same range applies to the above-mentioned polymer-bonded interlayer of version a). The white-pigmented transfer layer is preferably 15 to 25 $\mu$m thick and more preferably about 18 to 22 $\mu$m thick. If the transfer layer were to be any thinner, production difficulties would arise or the functionality of the particular layer would be affected. If the transfer layer were to be any thicker, no significant improvement would be obtained and unnecessary costs would be incurred. Also, a relatively thick tape cannot be used with the same advantage in a hand-held dispenser because, if the tape were too thick, the fixed volume of the cassette would inevitably mean a loss of tape length.

The present invention is not subject to any significant limitations in regard to the binders used for bonding the interlayer. The binders used in version a1) may be the same as those used in the formation of the white-pigmented transfer layer. Version a2) may even use those binders or polymers which are part of the layer of pressure-sensitive adhesive. Reference is made in this connection to the foregoing observations.

The auxiliary support of the transfer tape according to the invention preferably consists of a plastic film of the type normally used for the supports of typewriter ribbons, for example of polyethylene terephthalate, polypropylene, polyethylene, polyvinyl chloride or polycarbonate. Silicone-coated paper has also proved to be a suitable auxiliary support. The silicone coating leads to a reduction in the adhesive tension between the binder-containing transfer layer and the auxiliary support. It may be replaced by other non-stick materials, for example by polytetrafluoroethylene.

The auxiliary support is preferably about 10 to 16 $\mu$m thick and, more preferably, about 15 to 55 $\mu$m thick.

The above-described materials of the individual layers of the transfer tape according to the invention generally satisfy the basic requirement that, in the case of version a), the lowest adhesive tension (defined via the adhesion energy in accordance with Dupre's equation, Lit.: K. L. Wolf "Physik und Chemie der Grenzflächen", Springer Verlag 1957, page 164) occurring in the transfer layer/interlayer/pressure-sensitive adhesive layer combination or, in the case of version b), the adhesive tension between the transfer layer and the layer of pressure-sensitive adhesive is greater than the adhesive tension occurring between the auxiliary support and the transfer layer. If this is not the case, a suitable non-stick layer would have to be applied to the auxiliary support to satisfy this basic requirement. The transfer layer formed on the substrate should not be adhesive to other materials coming into contact with it, i.e. on contact with the hand or with paper. In the final analysis, therefore, the following adhesive tension ratios are necessary for the successful use of the transfer tape according to the invention, the symbol "S" standing for the adhesive tension ratio between the various materials: $S_1$ paper/pressure-sensitive adhesive layer, $S_2$ weakest bond in the transfer layer/interlayer/pressure-sensitive adhesive layer combination, $S_3$ transfer layer/auxiliary support, $S_4$ transfer layer/paper and $S_5$ pressure-sensitive adhesive layer/(back of the) support. Numerous requirements have to be satisfied in this regard: $S_1$ greater than $S_3$, $S_2$ greater than $S_3$, $S_5$ far smaller than $S_2$ and $S_5$ smaller than $S_3$. In addition, the free surface of the transfer layer applied to a substrate, more particularly to paper, should not be adhesive on the outside, i.e. $S_4$ is zero or substantially zero. In addition, where the transfer tape according to the invention is used in the form of a roll in a hand-held dispenser, this ensures that the pressure-sensitive adhesive layer shows an adhesion to the back of the auxiliary support which is weaker than the weakest adhesion in the transfer layer/interlayer/pressure-sensitive adhesive layer combination and weaker than the adhesion between the transfer layer and the auxiliary layer.

The transfer tape according to the invention is used with advantage in dispensers which enable the transfer layer coated with the pressure-sensitive adhesive to be unrolled and, at the same time, the auxiliary support to be rolled up. This leads on the one hand to particularly easy handling of the transfer tape according to the invention. Commercial hand-held dispensers may be used. A so-called hand roller is particularly suitable for this purpose. In hand rollers, an easy-grip housing accommodates a feed spool with the transfer tape from which it is guided over an application nib projecting from the housing and, from there, back to a take-up spool in the housing. A suitable gear between the two spools in the housing ensures that the transfer tape is always under sufficient tension. To use the transfer tape, the user picks up the dispenser and, by means of the application nib, presses the (removable) tape layer passing over its terminal edge onto the substrate to which it is to be transferred (for example a printed sheet of paper to make corrections). While applying pressure, the user moves the dispenser relative to the substrate and, in doing so, transfers for example an opaque layer or a fluorescent layer to the substrate, the flexible auxiliary support being offwound from the feed spool and wound onto the take-up spool.

In the final analysis, the advantages afforded by the invention lie in particular in the fact that a significant increase in covering power is achieved with the transfer tape according to the invention without any of the disadvantages which would arise if the content of darkening pigments were to be increased in the white-pigmented transfer layer. Even where white-pigmented transfer layers are intentionally toned down, a surprising effect is obtained by adopting the solution proposed in accordance with the invention. In this case, too, covering powder is unexpectedly increased.

Technologically, the present invention may be explained as follows but is not in any way limited to this explanation. In the prior art cited earlier, the transfer layer is also toned down. The effects obtained may be explained by the fact that the relatively large white pigment particles, more particularly titanium dioxide particles, are separated from one another by sizeable empty spaces which allow light beams to pass through to a considerable extent onto the letters to be masked so that they are not completely covered and show through. The white pigments in question cannot be produced in significantly smaller sizes at reasonable cost. The situation is different, for example, with carbon black of which the particles can readily be produced in colloidal particle sizes. By toning down the white-pigmented transfer layer, the relatively small carbon black particles are arranged in the empty spaces with the result that the passage of light beams is at least limited. There are limits to any increase in the quantity of carbon black used because the "whiteness" of the white-pigmented transfer layer is impaired to an increasing extent. Now, it must be extremely surprising to the expert that, in the absence of the darkening mentioned above, features a) and/or b) of the invention not only enable the desired whiteness of the white-pigmented transfer layer to remain substantially intact, they also increase the covering power of the transfer layer to a surprisingly favorable extent. This will be readily apparent to the observer. The possibility of still toning down the transfer layer to a slight extent remains unaffected.

The invention is illustrated by the following Examples:

EXAMPLE 1

The following aqueous dispersion is prepared for forming the white-pigmented transfer layer:

| | |
|---|---|
| Aqueous acrylate dispersion (25% in water; Worleecryl ® 7712W, a product of Worlee Chemie GmbH, Hamburg) | 23.42 parts by weight |
| Lactimon ® WS | 0.8 part by weight |

-continued

| | |
|---|---|
| (alkylammonium salts of polycarboxylic acids and polysiloxane copolymer) | |
| 2-Butoxyethanol | 1.5 part by weight |
| Byk ®-034 (hydrophobic silicone-like components in mineral oil) | 0.2 part by weight |
| Byk ®-307 (polyether-modified dimethyl polysiloxane copolymer) | 0.02 part by weight |
| Sorbitol | 5.00 parts by weight |
| Silica | 4.00 parts by weight |
| Titanium dioxide | 35.00 parts by weight |
| Ivory black | 0.06 part by weight |
| Aqueous dispersion of fine hollow beads | 30.00 parts by weight |
| | 100.00 parts by weight |

The aqueous hollow-bead dispersion mentioned above is prepared as follows:

800 Parts by weight of Ropaque® Emulsion Op-62 LO-E commercially available from Rohm & Haas Company, Philadelphia, USA (consisting of a non-film-forming polymer with an effective solids content of 52% and an actual solids content of 37.5% and a pH value of 8.0 to 8.7 (particle diameter 0.4 μm, internal diameter 0.28 μm) are mixed with 176 parts by weight of water and 2 parts by weight of a defoamer (Byk®-034, hydrophobic silicone-containing components in mineral oil) and 22 parts by weight of a formic acid solution (prepared by mixing 100 parts by weight of conc. formic acid and 900 parts by weight of water). 30 Parts by weight of this acidified dispersion are used in the above formulation.

The above masking composition is knife-coated onto a siliconized paper support in a quantity of 18 g/m$^2$. The water is then evaporated off at about 80° C. by passing warm air over the paper support.

An aqueous dispersion consisting of the following components is then knife-coated onto the surface of the transfer layer.

| | |
|---|---|
| Water | 30.5 parts by weight |
| Colanylschwarz PR 130 (a product of Hoechst AG, carbon black content about 30%, rest water and dispersant = paste) | 0.5 part by weight |
| Polymer dispersion VP 859/6 (50% acrylate pressure-sensitive adhesive, a product of Freihoff) | 67.00 parts by weight |
| 25% Ammonia | 2.00 parts by weight |
| | 100.00 parts by weight |

EXAMPLE 2

The procedure was as in Example 1 except that the following formulation was used for the adhesive layer:

| | |
|---|---|
| Water | 28.00 parts by weight |
| Aquasilber Aluminiumpaste LPW/1380 (a product of Carl Schlenk AG; aluminium content 65%, water content 35%; particle size 9 μm for an average of 50.3% of the particles) | 5.00 parts by weight |
| Lactimon WS | 0.50 part by weight |

-continued

| | |
|---|---|
| Polymer dispersion VP 859/6 | 65.00 parts by weight |
| 25% Aqueous ammonia | 1.50 part by weight |
| | 100.00 parts by weight |

We claim:

1. A multilayer flexible transfer tape comprising an auxiliary support, a pressure-sensitive adhesive layer about 1 to 5 μm thick, and a binder-containing white-pigmented transfer layer about 15 to 25 μm thick comprised of titanium dioxide having greater adhesion to the pressure-sensitive adhesive layer than to the auxiliary support which is present between the auxiliary support ad the pressure-sensitive adhesive layer, characterized in that from about 0.1 to 5% by weight of a non-white pigment is dispersed in a polymer-bonded interlayer situated between the white-pigmented transfer layer and the pressure-sensitive adhesive layer.

2. The transfer tape of claim 1 wherein the pressure-sensitive adhesive layer is comprised of at least 0.1% by weight of a non-white pigment.

3. The transfer tape of claim 1 wherein the polymer-bonded interlayer is comprised of about 0.2 to 3.5% by weight of the non-white pigment.

4. The transfer tape of claim 1 wherein the pressure-sensitive adhesive layer is comprised of about 0.2 to 3.5% by weight of a non-white pigment.

5. The transfer tape of claim 1 wherein the non-white pigment is a black pigment.

6. The transfer tape of claim 5, wherein the black pigment is carbon black.

7. The transfer tape of claim 1 wherein the non-white pigment is aluminum.

8. The transfer tape of claim 1 wherein the polymer-bonded interlayer is about 1 to 5 μm thick.

9. An article of manufacture comprising: the multilayer flexible transfer tape of claim 1 in roll form in a hand-held dispenser.

10. A multilayer flexible transfer tape comprising an auxiliary support, a pressure-sensitive adhesive layer about 1 to 5 μm thick, and a binder-containing white-pigmented transfer layer about 15 to 25 μm thick comprised of titanium dioxide having greater adhesion to the pressure-sensitive adhesive layer than to the auxiliary support which is present between the auxiliary support and the pressure-sensitive adhesive layer, characterized in that from about 0.1 to 5% by weight of a non-white pigment is present in a polymer-bonded interlayer situated on the white-pigmented transfer layer.

11. The transfer tape of claim 10 wherein the pressure-sensitive adhesive layer is comprised of at least 0.1% by weight of a non-white pigment.

12. The transfer tape of claim 10 wherein the polymer-bonded interlayer comprised of about 0.2 to 3.5% by weight of the non-white pigment.

13. The transfer tape of claim 10 wherein the pressure-sensitive adhesive layer is comprised of about 0.2 to 3.5% by weight of a non-white pigment.

14. The transfer tape of claim 10 wherein the non-white pigment is a black pigment.

15. The transfer tape of claim 14 wherein the black pigment is carbon black.

16. The transfer tape of claim 10 wherein the non-white pigment is aluminum.

17. The transfer tape of claim 10 wherein the polymer-bonded interlayer is about 1 to 5 μm thick.

18. An article of manufacture comprising: the multilayer flexible transfer tape of claim 10 in roll form in a hand-held dispenser.

19. A multilayer flexible transfer tape comprising an auxiliary support, a pressure-sensitive adhesive layer, and a binder-containing white-pigmented transfer layer having a greater adhesion to the pressure-sensitive adhesive layer than to the auxiliary support which is present between the auxiliary support and the pressure-sensitive adhesive layer, characterized in that a non-white pigment is present in a polymer-bonded interlayer situated in the white-pigmented transfer layer.

20. The transfer tape of claim 19 wherein the polymer-bonded interlayer is comprised of 0.1 to about 5% by weight of the non-white pigment.

21. The transfer tape of claim 19 wherein the non-white pigment is a black pigment or aluminum.

22. The transfer tape of claim 21 wherein the black pigment is carbon black.

23. The transfer tape of claim 19 wherein the white pigment is selected from the group consisting of titanium dioxide, precipitated chalk, alumina and colloidal silicas.

24. The transfer tape of claim 19 wherein the pressure-sensitive adhesive layer is about 1 to 5 $\mu$m thick, the transfer layer is about 15 to 25 $\mu$m thick and the polymer-bonded interlayer is about 1 to 5 $\mu$m thick.

* * * * *

UNITED STATES PATENT AND TRADEMARK OFFICE

CERTIFICATE OF CORRECTION

PATENT NO. : 6,432,515 B1
DATED : August 13, 2002
INVENTOR(S) : Titze et al.

It is certified that error appears in the above-identified patent and that said Letters Patent is hereby corrected as shown below:

Column 8,
Line 15, delete "ad" and insert therefor -- and --
Line 55, after "interlayer", insert -- is --

Signed and Sealed this

Eighteenth Day of March, 2003

JAMES E. ROGAN
*Director of the United States Patent and Trademark Office*